Jan. 2, 1940.  H. L. ROSENTHAL ET AL  2,185,739
CORN HUSKER AND SHREDDER
Filed Oct. 31, 1938
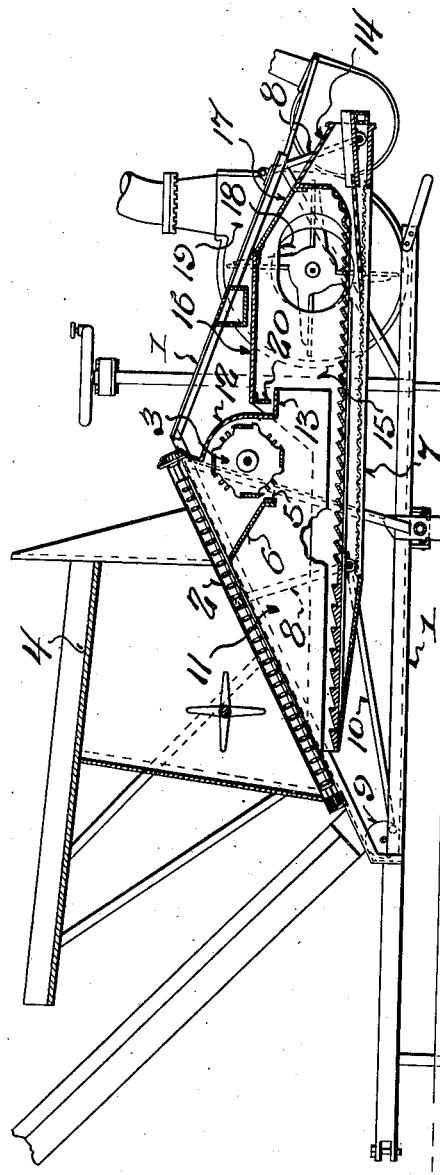
Inventors
Henry L. Rosenthal
and August Rosenthal
By
Attorneys.

Patented Jan. 2, 1940

2,185,739

UNITED STATES PATENT OFFICE 2,185,739

CORN HUSKER AND SHREDDER

Henry L. Rosenthal and August Rosenthal, Wauwatosa, Wis., assignors to Rosenthal Manufacturing Co., West Allis, Wis.

Application October 31, 1938, Serial No. 237,900

1 Claim. (Cl. 146—76)

This invention relates to corn huskers and shredders, such as disclosed in United States Letters Patent Nos. 1,531,758 and 1,582,542, in which the shredded material is fed to a blower conveyor by a rapidly reciprocated shaker trough.

In the patents referred to, the shaker trough reciprocates within a stationary housing having communication with a blower conveyor, and in order to gain access to the housing, in the event of clogging, the operator removes a portion of the casing and inserts his hands to clear the machine. This operation is usually performed while the machine is running, and because of the close proximity of the revolving cutter to the operator's hand, considerable danger exists.

Therefore, in Patent No. 1,582,542, a hinged shield is provided, which allows the material to be fed freely to the blower, but prevents the operator's hand from coming in contact with the rotary cutter. While the foregoing structure accomplishes its purpose fairly well, the same is not only costly, but in some instances the clogged material forces the shield to a raised position, exposing the shredder, and, at best, the shield interferes with the clearing operation, making it tedious and awkward.

The present invention has primarily for its object to improve structures of the foregoing type, both as to safety and efficiency.

Incidental to the foregoing, a more specific object of the invention resides in the provision of a machine in which the rotary cutter is mounted in a stationary housing under which the reciprocative shaker trough is positioned, the shaker trough extending rearwardly of the stationary housing, and having mounted on its rear end a closed housing movable with the shaker trough and communicating with the stationary housing, access to the machine, for the purpose of clearing the same, being had through the movable housing carried by the shaker trough.

With the above and other objects in view, which will appear as the description proceeds, the invention resides in the novel construction, combination, and arrangement of parts, substantially as hereinafter described, and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawing the single view is a longitudinal section through a machine constructed in accordance with the preferred form of the present invention.

Referring now more particularly to the accompanying drawing, the numeral 1 designates a frame, upon which the usual inclined stripping and husking rolls 2 are mounted. A rotary cutter 3 is positioned transversely below the upper or stripping ends of the rolls 2, and as the stalks fed from the table 4 pass downwardly through the rolls, the same are guided to a shear plate 5 by the inclined apron 6.

From the cutter the stalks are delivered to the reciprocative shaker trough 7, carried by links 8, connected with the frame 1. Upon reciprocation of the trough 7 by the crank 9 and pitman 10, the cut material is fed rearwardly upon the trough in the usual manner.

That portion of the machine below the husking and stripping rolls is provided with a stationary housing 11, the rear end of which is provided with an arcuate shield 12 surrounding the cutter 3 and provided with a horizontal flange 13 positioned in substantially the same plane as the lowermost portion of the cutter.

A closed housing, designated generally by the numeral 14, is carried by the reciprocative shaker trough 7, and includes side walls 15 and a cover 16. Access is had to the housing 14 through a hinged lid 17 intermediate the ends of the housing, while an elongated opening 18 formed in one of the side walls 15 provides communication with an opening in the blower conveyor 19 mounted on the frame 1.

It will be noted that the forward end of the cover 16 of the housing 14 is provided with a depending lip 20, which extends into close proximity with the horizontal extension 13 of the shield 12, thus affording a substantial closure between the stationary housing 11 and the reciprocative housing 14 to restrict to a minimum the entrance of air which would reduce the forced circulation created by the blower conveyor. At the same time relative movement between the stationary and reciprocative housings is provided for.

From the foregoing explanation, considered in connection with the accompanying drawing, it will be apparent that an exceedingly simple and inexpensive structure has been provided, in which access to the machine, for the purpose of clearing the same in the event of clogging, must be had through the movable housing 14. Consequently, it is imperative that the machine be stopped before access can be had, thus eliminating possible danger and injury to the operator.

Also, in view of the fact that the entire rear housing is movable, a more effective feeding of material is obtained, as there are no stationary obstructions to encounter the same, such as in conventional huskers.

Furthermore, due to the fact that the rear housing is a complete unit, instead of being formed in two sections, one slidable within the other as in conventional huskers, leakage of air between the sections that occurs in conventional structures is eliminated, thus maintaining maximum forced circulation of air to materially increase the efficiency of a feeding operation.

We claim:

In a machine of the class described, a frame, a rotary cutter mounted on the frame, a stationary housing mounted on the frame enclosing said cutter and having a rear wall extending downwardly to substantial horizontal alinement with the lower portion of the cutter and terminating in a horizontal flange, a reciprocative shaker trough positioned below said stationary cutter and extending rearwardly thereof, a stationary blower conveyor mounted on the frame and positioned at one side of the shaker trough adjacent its rear end, a closed housing carried by the rear end of said trough and communicating with said stationary housing, said closed housing being movable with the trough, the forward end of said shaker trough housing extending over said horizontal flange and provided with a depending lip terminating closely adjacent said flange, said closed housing having an opening in one side of its wall communicating with said blower conveyor, and a removable lid in said closed housing providing access thereto.

HENRY L. ROSENTHAL.
AUGUST ROSENTHAL.